United States Patent
Bonn et al.

[11] 3,799,574
[45] Mar. 26, 1974

[54] VEHICLE SAFETY DEVICE

[75] Inventors: Clifford Bonn, Buffalo, N.Y.;
Kenneth R. A. Wilson, Redondo Beach, Calif.

[73] Assignee: Irvin Industries Inc., Greenwich, Conn.

[22] Filed: Jan. 12, 1972

[21] Appl. No.: 217,308

Related U.S. Application Data

[60] Division of Ser. No. 101,253, Dec. 24, 1970, and a continuation-in-part of Ser. No. 22,429, March 25, 1970, abandoned.

[52] U.S. Cl. ............ 280/150 AB, 244/145, 182/38
[51] Int. Cl. ............................................ B60r 21/08
[58] Field of Search ............. 280/150 AB; 244/145; 5/347

[56] References Cited
UNITED STATES PATENTS

| | | | |
|---|---|---|---|
| 3,511,519 | 5/1950 | Martin | 280/150 AB |
| 2,974,912 | 3/1961 | Namsick | 244/138 R |
| 2,834,606 | 5/1958 | Bertrand | 280/150 AB |
| 3,481,625 | 12/1969 | Chute | 280/150 AB |
| 3,451,693 | 6/1969 | Carey | 280/150 AB |
| 3,451,694 | 6/1969 | Hass | 280/150 AB |
| 3,222,016 | 12/1965 | Boone | 244/145 |
| 3,410,511 | 11/1968 | Coppa | 188/1 |
| 2,798,820 | 7/1957 | Nelson | 117/44 X |
| 2,066,639 | 1/1937 | Masland | 117/44 X |
| 2,400,990 | 5/1946 | Hawley, Jr. | 117/38 |
| 3,603,430 | 9/1971 | Kendall | 5/347 |
| 3,680,886 | 8/1972 | Mazelsky | 280/150 AB |

OTHER PUBLICATIONS
Automatic Inflatable Occupant Restraint System, Kemmerer et al., 1/1968, pp. 3 and 5.

*Primary Examiner*—David Schonberg
*Assistant Examiner*—John P. Silverstrim
*Attorney, Agent, or Firm*—Browne, Beveridge, DeGrandi & Kline

[57] ABSTRACT

A vehicle safety device including an inflatable occupant restraint bag which is comprised at least in part of a woven stretch fabric which is permeable to fluid used to inflate the bag, the bag having a variable porosity which increases and decreases in relation to the fluid pressure within the bag.

1 Claim, 4 Drawing Figures

PATENTED MAR 26 1974    3,799,574

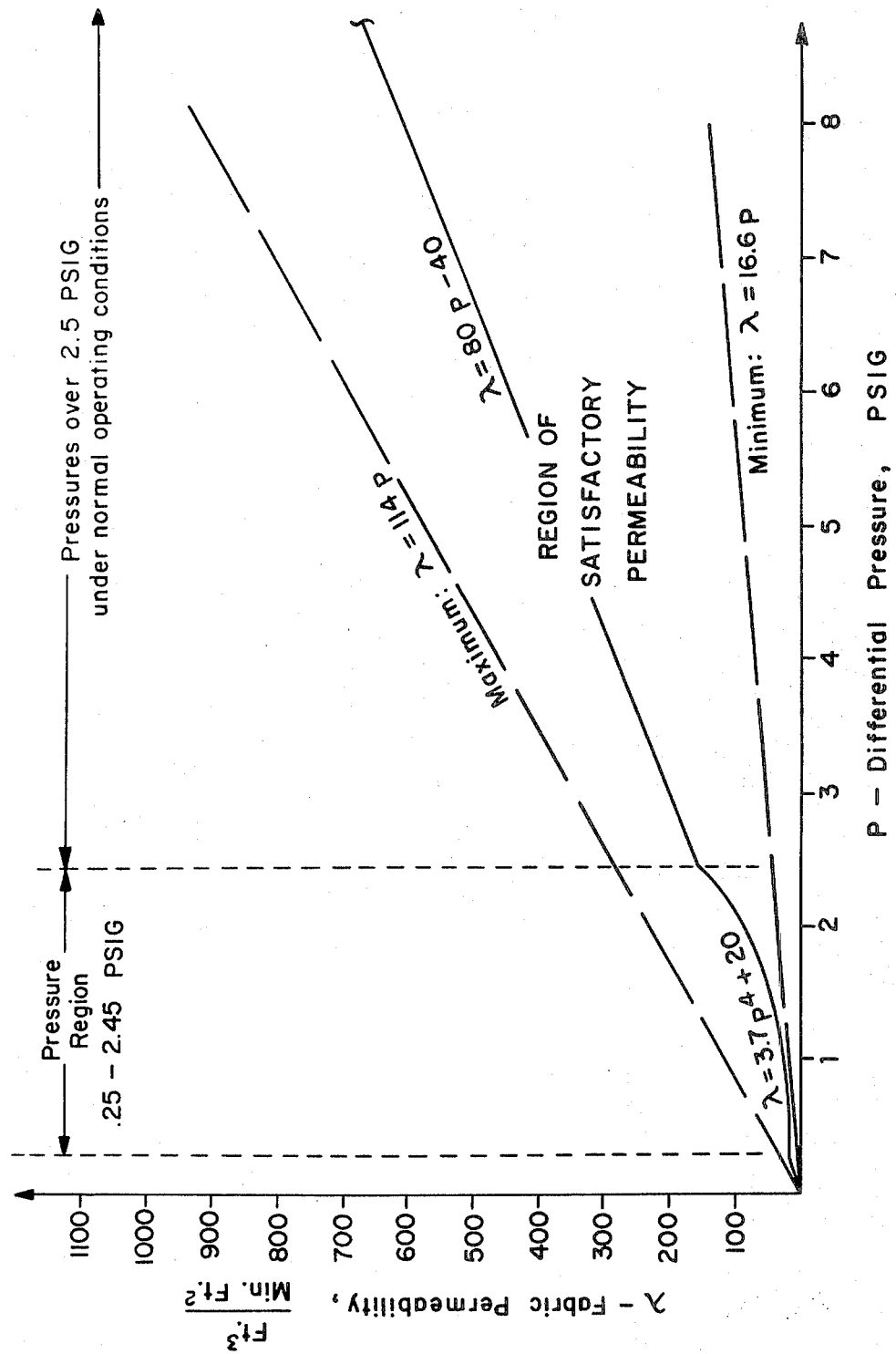

VEHICLE SAFETY DEVICE

This is a continuation-in-part of our application Ser. No. 22,429, filed Mar. 25, 1970, now abandoned and a division of our application Ser. No. 101,253, filed Dec. 24, 1970.

This invention relates to improvements in vehicle safety devices.

Inflatable occupant restraint bags previously considered have consisted of various designs, some of them being: (a) Those of material impermeable to the inflating fluid, relying upon various types of blow-out patches which are designed to rupture upon increase of pressure within the bag as the occupant is impacted thereagainst; (b) others in which the bag has been provided with a plurality of openings and is of a material, such as polyethylene having a type of semi-permanent set or stretch after occupant impact thereagainst so that the openings thereof may enlarge upon impact of an occupant thereagainst but will remain in such enlarged condition for at least the time period in which the bag would be useful in a given accident; and (c) others in which the bag has a plurality of openings, some of which will be covered by impact of an occupant thereagainst, causing increasing pressures in the bag as the size of the occupant increases.

All of such previously considered inflatable occupant restraint bags have proven unacceptable at least in part due to the fact that:

With respect to type (a) - Since the bag is of material impermeable to the fluid, the pressures built up therein prior to rupture of the blow-out patches have a tendency to cause the occupant to rebound from the bag, which may be injurious and, after rupture of the blow-out patches, there is not sufficient inflation to afford any protection in the event of secondary impact.

With respect to type (b) - The openings, having once enlarged upon impact, are not reduced in relation to reduction of fluid pressure within the bag, thus being no better than blow-out patches in affording protection in the event of secondary impact.

With respect to type (c) - The instantaneous area of openings is not continuously variable according to fluid pressures in the bag, but remains either essentially constant or undergoes a sudden finite expansion. Therefore, the fluid flow through the bag is not under continuous control and the likelihood of rebound increases with the size of the occupant and the number of orifices he will cover on impact with the bag.

Further, inflatable occupant restraint bags previously considered have contemplated use of a plastic bag. Inasmuch as these bags will likely be stored in a fixed folded position for long periods of time, it is anticipated that the same will have a tendency to weaken along the fold lines thereof, which may cause them to rupture on sudden inflation and may likewise acquire a set which inhibits fully operational inflation thereof.

The primary object of the present invention is the provision of a vehicle safety device which includes impact bag means comprised at least in part of a woven stretch fabric which is permeable to the fluid with which the bag means is inflated, the bag having a variable porosity which increases and decreases in relation to the fluid pressure within the impact bag means. The present invention thus permits passage of the inflating fluid through the fabric, dependent upon the impact pressures applied externally to the bag means, and the build-up of internal pressure, thus reducing or eliminating the undesirable effects of high peak forces and the secondary bounce or rebound associated with previously provided vehicle safety devices of this type.

A further object is the provision of an inflatable occupant restraint bag which affords protection in the case of secondary impact.

Other objects and advantages of the invention will become apparent during the course of the following detailed description, taken in connection with the accompanying drawings, and in which drawings:

FIG. 4 is a graph illustrating a minimum, maximum, and suggested permeability flow profile of woven stretch fabric of the present invention.

Figure 1:
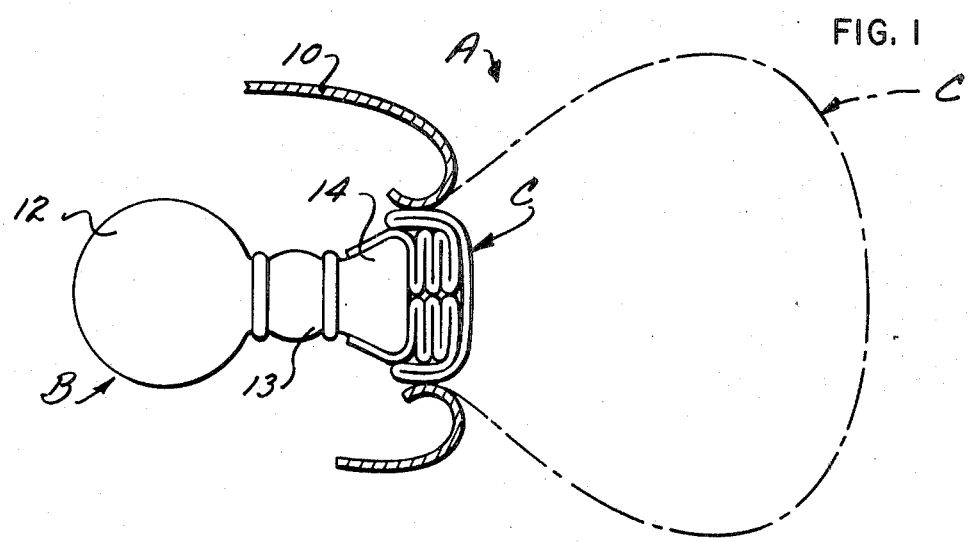
FIG. 1 is a diagrammatic view of a vehicle safety device according to the present invention.

In the drawings, wherein for the purpose of illustration is shown a preferred embodiment of the invention, and wherein similar reference characters designate corresponding parts throughout the several views, the letter A may designate an inflatable occupant restraint bag including fluid supply means B and impact bag means C.

Inflatable occupant restraint bag A may be suitably mounted on vehicle frame 10 by means of any appropriate mounting means. Since the inflatable occupant restraint bag will mainly be used in automobiles, it is obvious that the type of mounting will be dependent upon the location in which the same is to be mounted, for instance, it may be mounted on the dashboard in the case of the front-seat passenger side, possibly in combination with the steering wheel on the driver's side, and in various other positions as is appropriate considering the size and type of vehicle in which the same is to be mounted.

Fluid supply means B preferably includes a fluid source 12, and sensor valve means 13 which is operative on crash impact to permit fluid flow from fluid source 12 and into impact bag means C. A diffuser 14 may be provided for channeling fluid flow into impact bag means C.

Fluid source 12 may be of any acceptable design. For instance, in some instances it has been suggested to provide a container filled with compressed gases under extremely high pressures as a source for a fluid used to inflate an occupant restraint bag. Others have suggested the use of explosive devices and other means for instantaneous generation of expanding gases for inflation of the occupant restraint bag. Any suitable type may be used in connection with our invention.

Sensor valve means 13 may likewise comprise any conventionally acceptable sensing valve device. For example, there have been suggested uses of both electrical and mechanical devices which are usually inertia responsive in that they will be actuable on crash impact, usually in the range of eight to twelve miles an hour in connection with automobiles, to provide for fluid flow from fluid source 12 to impact bag means C virtually instantaneously as the crash impact occurs.

Diffuser 14 may likewise be of any acceptable type, providing for ready release of fluid into impact bag means C and may also serve as a source of attachment thereto of impact bag means C to form a unitary inflatable occupant restraint bag.

The characteristic of the fabric which is used to make the impact bag means and that enables a fluid to pass therethrough will be generally designated herein in terms of permeability. Permeability will be understood as referring to the volume of passing fluid per unit area per time unit.

When reference is made to the characteristic of the entire bag means that enables a fluid to pass therethrough, the same will be generally designated in terms of porosity. Porosity may be understood as the ratio of openings and orifices in the fabric in relation to the total area of the assembled bag.

Impact bag means C is preferably comprised at least in part of a woven stretch fabric which is permeable to the fluid used to inflate the same. Inasmuch as it is believed that the safety device of this invention will most likely include impact bag means C which is made entirely of a woven stretch fabric which is permeable to fluid released from fluid source 12, this is the form which has been shown in the drawing. Of course, it is to be understood that the entire impact bag means C does not have to be composed of woven stretch fabric, but that such woven fabric could be used at only selected locations of the impact bag means, the remainder of the same being of a fabric impermeable to fluid from fluid source 12, the fluid permeable woven stretch fabric parts thereof acting in the nature of blow-out or rupturable parts of such bags, but wherein the permeable woven fabric does not rupture, but permits regulated release of fluid from the bag, in relation to the fluid pressure within the bag.

A woven stretch fabric according to this disclosure is deemed to be one in which the warp, weft, or both include stretch yarns. The denier used for the warp is not necessarily the same as the denier of the weft, and the specific denier used may be dependent upon the type and uses of the vehicle in which the same may be employed. The particular weave used may also be varied.

In brief, we seek to provide an inflatable occupant restraint bag of woven stretch fabric which has a suitable tensile strength and a variable porosity. Also, since we do not want a bag which may provide increased porosity on impact and which increased porosity is at least semi-permanent, the woven stretch fabric of the present invention preferably has a virtually instantaneous recovery of at least 70 percent after elongation under normal operating conditions.

We preferably employ a woven stretch fabric having a warp of high tenacity nylon and a weft of nylon clad spandex fiber.

A spandex fiber may be generically defined as a manufactured fiber in which the fiber forming substance is a long chain synthetic elastomer comprised of at least 85 percent of a segmented polyurethane. "Lycra," manufactured by E. I. DuPont de Nemours & Company (INC.) is a type of spandex fiber which we have found suitable.

A suitable woven stretch fabric is one having a warp of from 420–840 denier high tenacity nylon and a weft of spandex fiber (such as Lycra) of 140–560 denier wrapped with ends of 210-420 denier high tenacity nylon. The spandex fiber is preferably woven under stretch of 150–300 percent (well below the permanent set stretch point thereof). The warp is preferably comprised of 35–70 ends per inch, dependent on the denier selected, and the weft is preferably comprised of 22–48 picks or fills per inch, again dependent on the denier selected.

A specific example of a suitable woven stretch fabric is one which has a warp of 420 denier high tenacity nylon, 70 ends per inch, and a weft of 560 denier spandex fiber under 300 percent stretch, wrapped with 2 ends of 210 denier high tenacity nylon having 45 picks per inch. This woven stretch fabric will have a virtually instantaneous recovery of 85–95 percent after elongation below permanent set.

It is, of course, to be understood that our invention is not limited to the specifics of the woven stretch fabric above enumerated, others being acceptable as long as they fall within the parameters of variable permeability as herein set forth.

Figure 2:
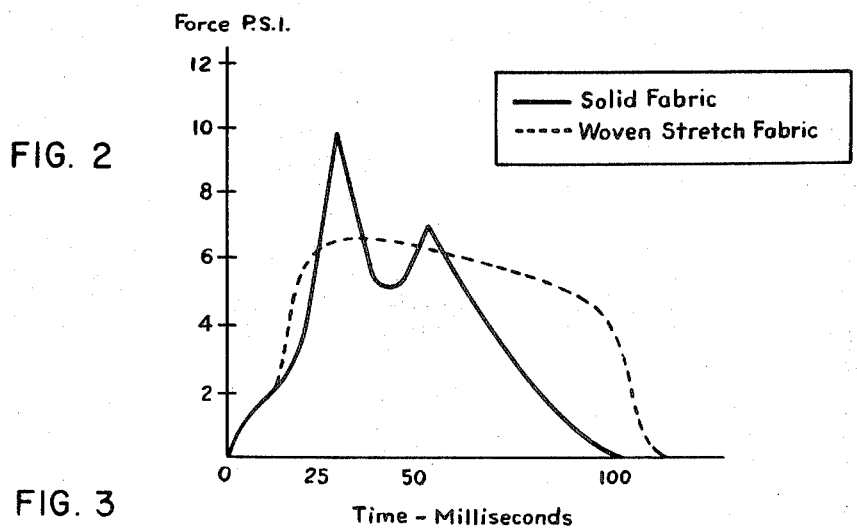
FIGS. 2 and 3 are graphs depicting the typical force v. time curves of previously provided vehicle safety devices of this type as compared with applicants' invention.

Referring to the graph of FIG. 2 and the designation of solid fabric, which is a substantially impermeable fabric presently used and in which blow-out patches or some other type of rupturable device is used for release of fluid from the inflated occupant restraint bag. Taking the point of zero as the instant of impact, the bag is fully inflated to approximately 2 pounds per square inch in about 25 milliseconds, pressures in the bag increasing to approximately 10 pounds per square inch on occupant impact. This type of bag usually has a rebound peak, as deflation through rupture of the bag occurs, indicated by the second peak of the graph, the solid fabric bag fully deflating in approximately 80 to 100 milliseconds.

In comparison, referring to FIG. 2 again, the woven stretch fabric is again inflated in approximately 25 milliseconds, expanding under stress of impact of the occupant, permitting a greater or lesser flow of fluid through the woven stretch fabric, dependent upon the magnitude of the localized impact of the occupant thereagainst, and eliminating the undesirable effects associated with the high peak forces and secondary bounce of solid fabric restraint bags. The self regulating features of such variable porosity contains peak forces within acceptable limits.

Figure 3:
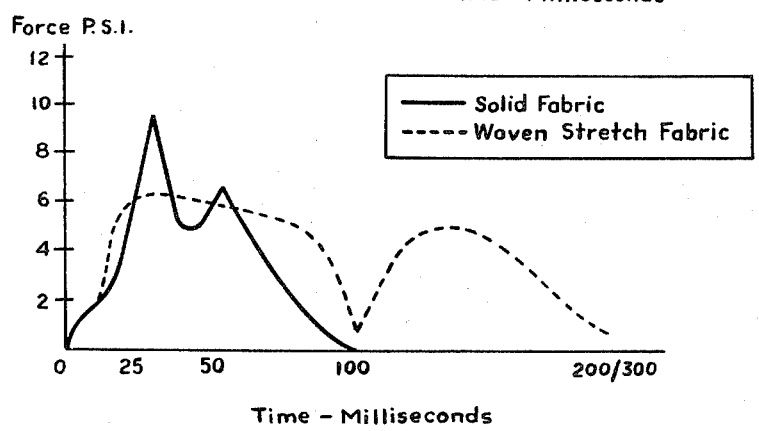

As shown, our improved woven stretch fabric inflatable occupant restraint bag is likewise virtually instantly deflatable, after impact, in the order of from 80 to 100 milliseconds, but such deflation is relatively constant rather than immediate and total as is the case with solid fabric impact bags. As shown in FIG. 3, this is likely to be important in cases where a secondary crash may be involved, for instance, in a vehicle which may impact against first one object and then another. The solid fabric bag in which the blow-out patch or rupturable portion has been ruptured will provide less protection against a secondary impact than a bag having a generally constant rate of deflation, through intact woven stretch fabric, providing a greater degree of retained pressure of fluid within the bag, so that the same may still serve as an adequate restraint in the case of a secondary impact.

In FIG. 4 we have endeavored to further delineate a region of satisfactory fabric permeability. The curves shown are flow profiles under impact conditions at a velocity of 30 miles per hour. As shown, the flow profile desirable is between a maximum of $\lambda = 114p$ and a minimum of $\lambda = 16.6p$ wherein $\lambda$ is the fabric permeability in terms of cubic feet of fluid flow per square foot per minute and $p$ is the differential pressure of fluid in the restraint bag in terms of pounds per square inch gauge. A suggested permeability curve within such minimum and maximum is $\lambda = 3.7p^4 + 20$ at differential pressures of substantially 0.25 – 2.45 pounds per square inch gauge and $\lambda = 80P - 40$ at differential pressures above 2.5 pounds per square inch gauge within the range of differential pressures to which such restraint bags will normally be subjected.

In some instances we have found that a fluid permeable plastic coating may be applied to a woven stretch fabric in order to more closely regulate the variable permeability thereof. One such coating we have found satisfactory is a polyurethane which has had salt mixed with it, the salt being leeched out to provide permeability. Application of such plastic coating does not inhibit the basic characteristics of the woven stretch fabric, for instance, the recovery after elongation characteristics thereof.

Various changes may be made in the shape, size and arrangement of parts herein shown and described without departing from the spirit of the invention or the scope of the following claims.

We claim:

1. A vehicle safety device including impact bag means inflatable on crash impact for protection of an occupant of a vehicle, a fluid source, and means providing for fluid flow from said fluid source to effect inflation of said impact bag means on crash impact, said impact bag means comprising at least in part a woven stretch fabric having a plurality of threads of stretch yarn extending in at least one direction in juxtaposition for elongation of the woven stretch fabric so that inflating fluid permeability of the woven stretch fabric portion of said impact bag means is increased upon occupant impact against said impact bag means and upon increase of fluid pressure within said impact bag means by enlargement of the openings in said woven stretch fabric portion there of, said woven stretch fabric having substantially instantaneous recovery of at least 70 percent after elongation within the range of differential pressures to which such an impact bag means will normally be subjected so that inflating fluid permeability thereof is decreased upon decrease of fluid pressure within said impact bag means and by dissipation of the forces of occupant impact against said impact bag means by decrease in the size of the openings in said woven stretch fabric portion thereof and having a permeability/pressure curve under impact conditions at a velocity of 30 miles per hour and within the range of differential pressures to which such impact bag means will be normally subjected which substantially conform to the empirical formula $\lambda = 3.7p^4 + 20$ at differential pressures of substantially 0.25 – 2.45 pounds per square inch gauge and substantially conforms to the formula $\lambda = 80p - 40$ at differential pressures above 2.5 pounds per square inch gauge, wherein $\lambda$ is fabric permeability in terms of cubic feet of fluid flow per square foot per minute and $p$ is the differential pressure of fluid in the impact bag means in terms of pounds per square inch gauge, the openings in said woven stretch fabric being continuously variable in direct relation to fluid pressures within said impact bag means.

* * * * *